(No Model.)
E. B. CUTTEN.
APPARATUS FOR THE ELECTROLYTIC PRODUCTION OF SODA AND CHLORINE.
No. 505,895. Patented Oct. 3, 1893.
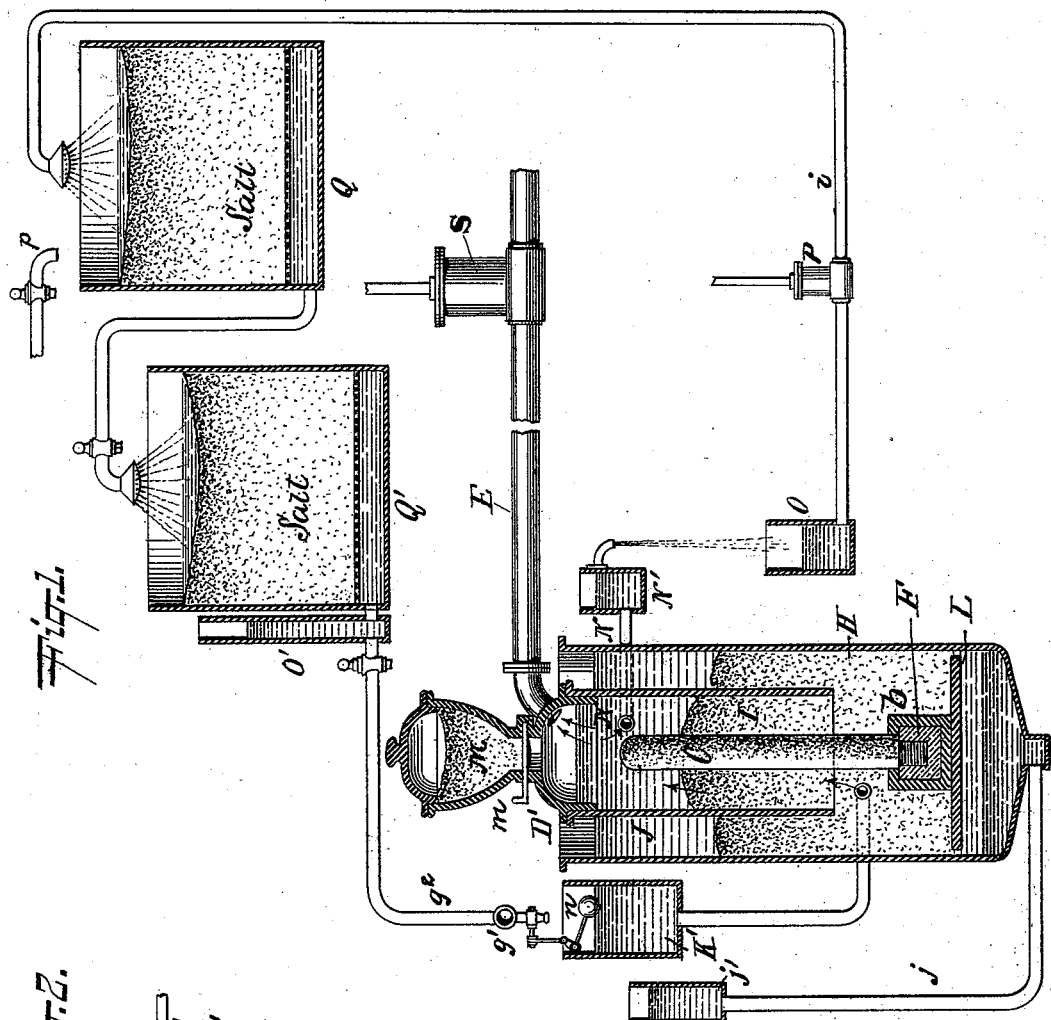
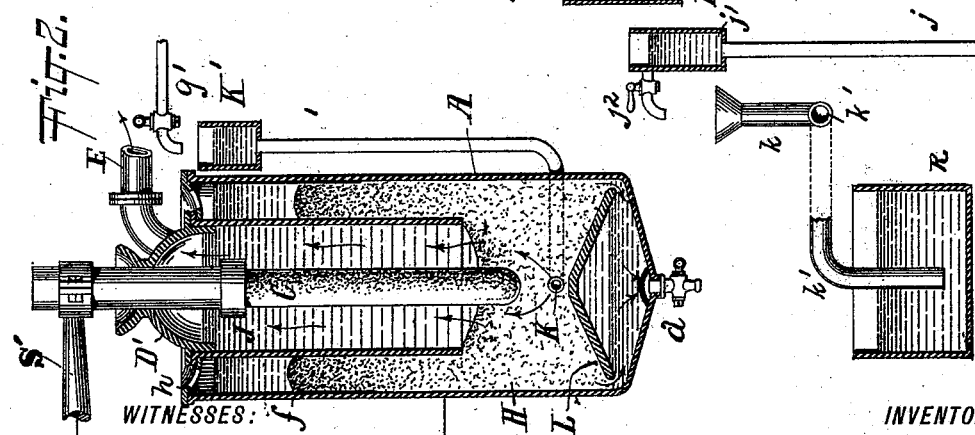
INVENTOR
Elisha B. Cutten
BY Park Benjamin
his ATTORNEY.

UNITED STATES PATENT OFFICE.

ELISHA B. CUTTEN, OF NEW YORK, N. Y.

APPARATUS FOR THE ELECTROLYTIC PRODUCTION OF SODA AND CHLORINE.

SPECIFICATION forming part of Letters Patent No. 505,895, dated October 3, 1893.

Application filed December 30, 1891. Serial No. 416,563. (No model.)

*To all whom it may concern:*

Be it known that I, ELISHA B. CUTTEN, of the city, county, and State of New York, have invented a new and useful Improvement in Apparatus for the Electrolytic Production of Soda and Chlorine, of which the following is a specification.

My invention relates to the manufacture of chlorine and caustic soda by the electrolytic decomposition of common salt.

In another application for Letters Patent filed simultaneously herewith, Serial No. 416,562, I have described and claimed my method of obtaining soda and chlorine by electrolytic decomposition of a sodium chloride solution.

My present invention has particular reference to an improved form of apparatus for carrying the said process into practical effect, and my said invention consists in the construction and arrangement of said apparatus as hereinafter more particularly set forth.

The fact that common salt (sodium chloride, $Na,Cl$) can be decomposed from an aqueous solution by the action of an electrical current, has long been known. Chlorine (Cl) is then liberated at the anode, and sodium (Na) is liberated at the cathode, and by reason of the decomposition of the water, caustic soda (sodium hydrate, $Na,H,O$) is formed.

The principal obstacles to the separation of chlorine and soda by electrolysis as aforesaid are, first, production of chlorinated soda ($Cl,Na,O$) by the combination of the chlorine and caustic soda in the cell, which, being a less stable compound than the sodium chloride solution, uselessly absorbs the electrical energy for its decomposition; and second, the weakening of the electrolyte due to the liberation of the solvent, water, at the surface of the anode, where it is decomposed also at the expense of the current. I have discovered that these, as well as other difficulties well known in the operation, can be obviated by my new method, the principle of which is two-fold, and is as follows:

To cause that part of the solution which, as the electrolytic process proceeds becomes heavily charged with soda, to become separated from the remaining or salt chlorine part of the solution, and then to draw it off; to reduce the affinity of the salt chlorine solution for the salt soda solution by reducing the chlorine present by mechanically removing said chlorine from the solution. The consequence is the production of a very dense salt soda solution from which the soda can be obtained by simple evaporation and the separation of chlorine in gaseous form.

In the accompanying drawings, Figure 1 shows an electrolytic cell wherein my process may be carried into effect usefully; the said cell being represented in vertical section and in connection with other apparatus for the supply and reception of the sodium chloride solution and of the products obtained. Fig. 2 represents a modification of the cell proper also in vertical section.

Similar letters in both figures indicate corresponding parts.

Referring first to Fig. 2, A is a tank of iron to which one terminal from the dynamo G or other source of electricity is connected, so that said tank forms the cathode in the cell. The other terminal of the battery is connected to a supporting sleeve or holder for the carbon rod C, which is the anode in the cell. The anode is placed in a cylinder J, which may be of glass, and which is open at the bottom. The cylinder has a flange at its upper rim, and by this flange it is supported upon brackets $h$ which extend inward from the rim of the vessel A. The top of the cylinder J is closed by a cover D' through which the support S' for the anode passes. The pipe E communicates with the cover D' and may lead, as shown in Fig. 1, to any suitable form of pump S, exhauster or suction apparatus. $g'$ is a faucet through which is drawn the supply of sodium chloride solution to be electrolyzed. This is received first in a small tank K', whence it passes to the vessel A by a tube which opens into said vessel A near the bottom part thereof. It will be observed that there is considerable space between the bottom of the cylinder J and the bottom of the vessel A, for the accumulation of the soda solution. The inner side of the vessel A is covered with varnish or other insulating coating $f$ for a considerable distance downward. The production of soda is thus limited to the cathode surface below this coating; the object being to render the upper portion of the salt solution in the vessel A as free as possible from soda. The bottom of the vessel A is funnel-shaped, and is provided with a faucet $a$ for convenience in drawing off the solution. Near the bottom of the vessel A is a plate or partition L, preferably of glass, which causes the descending solution to pass outwardly away from the anode, and also serves to intercept any bubbles of hydrogen which may be liberated from the bottom of the tank, and prevent their ascent into the solution J. I will now describe the operation of this cell. A quantity of salt is packed in the vessel A, as indicated at H. The pump in communication with pipe E is operated until the level of the liquid in the cylinder J is from one-half an inch to an inch above that of the liquid in vessel A. The current is then established. The chlorine formed at the anode C (or a very large percentage of it) is mechanically drawn out of the liquid by the action of the pump and through the tube E to any suitable reservoir. Whatever chlorine may remain in the solution appears in the form of ascending bubbles close to the anode, while practically none is found on the wall of the cylinder J. The change of color of the solution is, as the chlorine is drawn out of it, quite manifest. Meanwhile, in the vessel A, soda is formed, and hydrogen is liberated; the latter, if unobstructed, rising along the wall of the vessel and escaping at the top. Most of the soda then goes to the bottom of the cell to form a strong soda solution, as indicated by the arrows, while, of course, some of it mixes with the salt solution. It will be observed, however, that the dense soda solution goes to the bottom of the cell by its own gravity. It will thus be apparent that the soda is prevented from attack by the chlorine in two ways; first, as a consequence of its own gravitation to a place where the chlorine cannot easily get to it, and second, by the mechanical removal of the chlorine from the solution as fast as it is generated.

I have found that even when a body of salt, such as H, is not used, no perceptible quantity of hydrogen is drawn into the cylinder J, even under a suction much more powerful than that which meets all the requirements of the process; hence there is no waste of power due to the generation of hydro-chloric acid due to the union of hydrogen with the chlorine. When the body of salt H is not employed, the anode C may be made shorter; not extending below the lower edge of cylinder J. I find that there is an advantage in introducing the current of saturated salt solution at the point K so that it will pass, as indicated by the arrows, upwardly along the surface of the anode.

Referring now to Fig. 1, it will be observed that the outer vessel A, the inner cylinder J and the cover D' are substantially the same in construction as has already been described in connection with Fig. 2. The anode C of carbon, however, instead of extending downward into the cylinder J, extends upward. It is inserted into a block of carbon F, which is surrounded by insulating material $b$, and this rests upon the glass partition L, which is supported in any suitable way within the vessel A. It will be noticed that a flat plate L is here substituted for the conical plate L of Fig. 2. One terminal of the battery is connected, in any suitable way, to the block F. I have, in this figure, shown a mass of solid salt I, surrounding the anode within the cylinder J, in addition to the mass of salt H in the vessel A, the two masses becoming practically one in the lower portion of the vessel A below the cylinder J. In order to conveniently introduce the salt into the cylinder J from time to time in order to strengthen the solution, as it becomes weakened at the anode, I arrange above the cover D' a hopper M having a removable cover which is to be kept filled with salt. In the bottom of the hopper I provide a movable slide $m$. By withdrawing this slide, the salt may be caused to descend through the cover D' and into the cylinder J, so that it is not necessary to open the top of said cylinder; and in this way, any loss of chlorine gas and also the introduction of atmospheric air into the cylinder J, is prevented. The slide $m$ is to be ground to a close fit or to be packed in any suitable way.

I will now describe the various accessories which it is desired to employ with the electrolytic tank. To supply strong salt solution in place of that which is weakened at the anode, a pipe opening into the cell at K leads from the supply vessel K'. The result is an upward circulation through the cylinder J. The weakened liquid adjacent to the anode, being of reduced specific gravity, also rises, and this weak liquor is drawn off by a pipe N which opens into the cylinder J and communicates with a vessel N', in which the level is maintained nearly the same as that in the outer vessel J. The overflow from this cup discharges into a tank O from which it is lifted by a pump P through a pipe $i$, and is finally discharged into a tank Q in which a mass of salt is placed. This body of salt rests upon a perforated false bottom in the tank Q. The weakened liquor, in percolating down through the mass of salt in vessel Q, is re-fortified, and it finally passes through an outflow pipe communicating with the bottom of vessel Q, as shown in the drawings, below the perforated false bottom, whence it is discharged into a second fortifying vessel Q', similarly constructed to vessel Q, through the body of salt in which it percolates, and finally is discharged through a pipe $g^2$ leading to the faucet $g'$. The valve of faucet $g'$ is controlled by levers operated by a float $n$ in accordance with a well-known construction for controllable valves of this kind, which float rests upon the solution in the vessel K'.

It will be seen from the foregoing that I have provided means for continuous circulation. The strong salt solution entering the vessel A at the point K, rises through the mass of salt I and through the liquor in the cylinder J, and becoming weakened through the process of electrolysis, then passing in its weak state from the vessel J by the pipe N to the receptacle N'. Then flowing over into the receptacle O, it is pumped through the pipe $i$ to the vessel Q, and so to the vessel Q', in passing through which vessels it becomes re-charged with salt, and finally from the vessel Q' back through the pipe $g^2$ and faucet $g'$ to the receptacle K'. The float $n$, of course, regulates the flow as may be desired, the valve $g'$ opening in the usual way, when the liquid in receptacle K' becomes sufficiently lowered to allow the float $n$ to descend and so open the valve. By this means the electric decomposition of water freed from the solution by the decomposition of its dissolved salt, is practically prevented. In connection with the receptacle Q', I arrange a short stand-pipe O', in which the strengthened liquor may accumulate when the valve $g'$ is closed. Instead of discharging the strong salt soda solution which, as already described, descends, by its own gravity to the bottom of the vessel A and beneath the partition L through a cock of valve $a$, as shown in Fig. 2, it may be discharged through a stand pipe $j$ into a cup $j'$, and thence be allowed to drip or trickle from a faucet $j^2$ (the stream being thus sub-divided into drops for the purpose of electrical insulation) into a receiving funnel $k$ which communicates with a pipe $k'$, which leads into the receiving tank R for the dense solution. The chlorine which is removed through the pipe E by the action of the pump S may be conducted to any suitable receptacle or utilized as may be desired.

In order to start the apparatus, I provide above the vessel Q a cock $p$ for the delivery therein of brine. The masses of salt H and I placed in the cell, serve both to keep up the strength of the solution and also to prevent diffusion of the generated soda toward the anode, and to facilitate its gravitation to the bottom of the cell. In place of such salt I may substitute any comminuted substance which will not be attacked by the solution, this comminuted substance acting simply mechanically in the manner and for the purpose already stated.

I claim—

1. In an electrolytic cell, a bell-shaped receiver surrounding one electrode of said cell and immersed in the electrolyte, and means, such as a pump, for withdrawing from said receiver the gas generated in the electrolyte at said electrode.

2. The combination, in an electrolytic cell having no diaphragm or partition interposed between the electrodes, of an inverted cup or bell-shaped vessel of non-porous material inclosing one electrode and immersed in the electrolyte, and a gas pump or exhauster communicating with said cup above the level of said electrolyte.

3. The combination, in an electrolytic cell, of an outer vessel, an electrode and an inverted cup or bell-shaped vessel of non-porous material in said outer vessel, immersed in the electrolyte and surrounding said electrode; the said electrode being supported outside of and extending downward into said cup.

4. The combination of an electrolytic cell having an outer vessel, an electrode, an inverted cup or bell-shaped vessel of non-porous material in said outer vessel, immersed in the electrolyte and surrounding the electrode with a source of supply for the electrolyte communicating with said outer vessel below the lower edge of said cup.

5. The combination of an electrolytic cell having an outer vessel, an electrode, an inverted cup or bell-shaped vessel of non-porous material in said outer vessel, immersed in the electrolyte and surrounding the electrode, with a source of supply for the electrolyte communicating with said outer vessel below the lower edge of said cup, and an outlet opening for the escape of said electrolyte communicating with the interior of said cup below the liquid level therein.

6. The combination, in an electrolytic cell, of an outer vessel forming the cathode, an inverted cup or bell-shaped vessel of non-porous material in said outer vessel and immersed in the electrolyte, an anode supported within said cup, and a tube or conduit extending from said inner vessel through the wall of said outer vessel; the said outer vessel being provided with an inlet opening for the electrolyte located below the said cup and at a distance above the bottom of said outer vessel, so that a chamber will be formed in the lower part of said outer vessel to receive the denser portion of the electrolyte.

7. In an electrolytic cell, an outer vessel forming a cathode, an anode therein, a chamber inclosing said anode, an inlet pipe communicating with said chamber for discharging a liquid electrolyte therein, an outlet pipe for said electrolyte communicating with said chamber, a re-fortifying tank for said electrolyte, and a pump for causing the circulation of said electrolyte through said tank and said cell, substantially as described.

8. The combination, in an electrolytic cell, of an electrode, a chamber inclosing said electrode and immersed in the electrolyte, a conduit opening into said chamber above the liquid level, a hopper over said chamber, and a valve between said hopper and said chamber, substantially as described.

9. In combination with the outer vessel A forming the cathode, of an electrolytic cell, the anode C and the bell J surrounding said anode and having an outlet for the escape of the electrolyte therefrom, of a pump P a refortifying tank Q and intermediate conduits: whereby the liquid from the cell is led to said pump, thence to the refortifying tank and thence to the vessel A below said bell J.

10. In combination with the outer vessel A forming the cathode of an electrolytic cell, the anode C, the bell J surrounding said anode, a conduit for the electrolyte leading from said bell to the exterior of said outer vessel, a receptacle for said liquid disposed below the delivery opening of said conduit, a pump P communicating with said receptacle, a refortifying tank Q and intermediate conduits whereby the liquid from said receptacle is led to said pump, thence to the refortifying tank and thence to the vessel A below said bell J.

ELISHA B. CUTTEN.

Witnesses:
H. R. MOLLER,
M. BOSCH.